(12) United States Patent
Inam et al.

(10) Patent No.: US 10,924,012 B1
(45) Date of Patent: Feb. 16, 2021

(54) POWER CONVERTER WITH HIGH DUTY CYCLE COMPENSATION

(71) Applicant: Apple Inc., Cupertino, CA (US)

(72) Inventors: Yesim Inam, Munich (DE); Miguel A. Dos Santos, Munich (DE); Fabio Ongaro, Unterhaching (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/585,261

(22) Filed: Sep. 27, 2019

(51) Int. Cl.
  *H02M 3/156* (2006.01)

(52) U.S. Cl.
  CPC .... *H02M 3/156* (2013.01); *H02M 2003/1566* (2013.01)

(58) Field of Classification Search
  CPC ........................................... H02M 3/155–1588
  See application file for complete search history.

(56) References Cited

U.S. PATENT DOCUMENTS

| 6,979,987 | B2 | 12/2005 | Kernahan et al. |
| 9,806,523 | B2 | 10/2017 | Stratakos et al. |
| 2013/0193941 | A1* | 8/2013 | DeFazio .................. G05F 1/46 323/282 |
| 2014/0091631 | A1* | 4/2014 | Naden ................. H02M 3/1584 307/82 |

* cited by examiner

*Primary Examiner* — Peter M Novak
(74) *Attorney, Agent, or Firm* — Kowert, Hood, Munyon, Rankin & Goetzel, P.C (57) ABSTRACT

A power converter circuit that includes a switch node coupled to a regulated power supply node via an inductor may, during a charge cycle, source current to the switch node, and source a bypass current to the regulated power supply node using a regulator control signal. A control circuit may initiate the charge cycle using a first reference voltage level and a sensed inductor current, and generate the regulator control signal using a second reference voltage level and a voltage level of the regulated power supply node.

18 Claims, 7 Drawing Sheets

POWER CONVERTER WITH HIGH DUTY CYCLE COMPENSATION

BACKGROUND

Technical Field

Embodiments described herein relate to integrated circuits, and more particularly, to techniques for generating regulated power supply voltages.

Description of the Related Art

Modern computer systems may include multiple circuits blocks designed to perform various functions. For example, such circuit blocks may include processors, processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generated regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments of a power converter circuit are disclosed. Broadly speaking, a power converter circuit is contemplated, in which a switch node is coupled to a regulated power supply node via an inductor. The power converter circuit may be configured to source a charge current to the switch node in response to an initiation of a charge cycle, and source a bypass current to the regulated power supply node using a regulator control signal. A control circuit may be configured to initiate the charge cycle using a first reference voltage level and a sensed inductor current, and generate the regulator control signal using a second reference voltage level and a voltage level of the regulated power supply node. In another non-limiting embodiment, the control circuit may be further configured to generate the second reference voltage level using the first reference voltage level and a bias current,

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ regulator circuit that includes both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such buck converter circuits include multiple devices and a switch node that is coupled to a regulated power supply node via an inductor. Particular ones of the multiple devices are then activated to periodically charge and discharge the switch node in order to maintain a desired voltage level on power supply node.

Due to the switching nature of some power converter circuits, as well as changes in current drawn by load circuits, the voltage level of a regulated power supply node may vary. The accuracy of the voltage level of the regulated power supply is, however, important to proper operation of the load circuits. For example, if the voltage level of the regulated power supply node falls below a threshold value, the functionality of the load circuits may be compromised.

In some cases, such as battery-powered applications, the voltage level of the input power supply can also affect the voltage level of the regulated power supply node. During operation, the voltage level of a battery may drop resulting in the power converter circuit having to continuously source current to the load (commonly referred to as "operating in 100 percent duty cycle mode").

Operating a power converter circuit in such a fashion may result in a variety of problems. For example, with a device coupling a switch node of the power converter circuit to the input power supply node (referred to as a "high-side switch") continuously activated, the output impedance of the power converter circuit appears as an oscillating resistor inductor capacitor (RLC) circuit. Additionally, during such regimes of operation, the gain of the power converter circuit can be low, resulting in poor transient response to changes in current demand from the load circuits. In high-current applications with a high duty cycle, an added voltage drop resulting from the series resistance of the inductor and on-resistance of the high-side switch may cause the voltage level on the regulated power supply node to drop below the threshold value.

To compensate for the undesirable characteristics during high duty cycle operation, some power converters add a switch between the input power supply node and the regulated power supply node. The switch is closed in response the voltage level of the regulated power supply node falling below a minimum value. When the switch is closed, the regulated power supply node is coupled to the input power supply node. While such an implementation can reduce the RLC impedance effect as well as the impedance between the input power supply node and the regulated power supply node, closing the switch can result in voltage and/or current spikes on the both the regulated power supply node and the input power supply node, possibly resulting in damage to load or other circuits within the computer system.

The embodiments illustrated in the drawings and described below may provide techniques for operating a power converter circuit using a bypass switch that operates, in parallel with the power converter, as a low dropout (LDO) regulator, which can provide additional current to be supplied to a regulated power supply node. By using a bypass switch in such a fashion, a minimum voltage level on a regulated power supply node may be maintained, while reducing the possibility of introducing voltage and/or current spikes on the input power supply node and the regulated power supply node.

Figure 1:
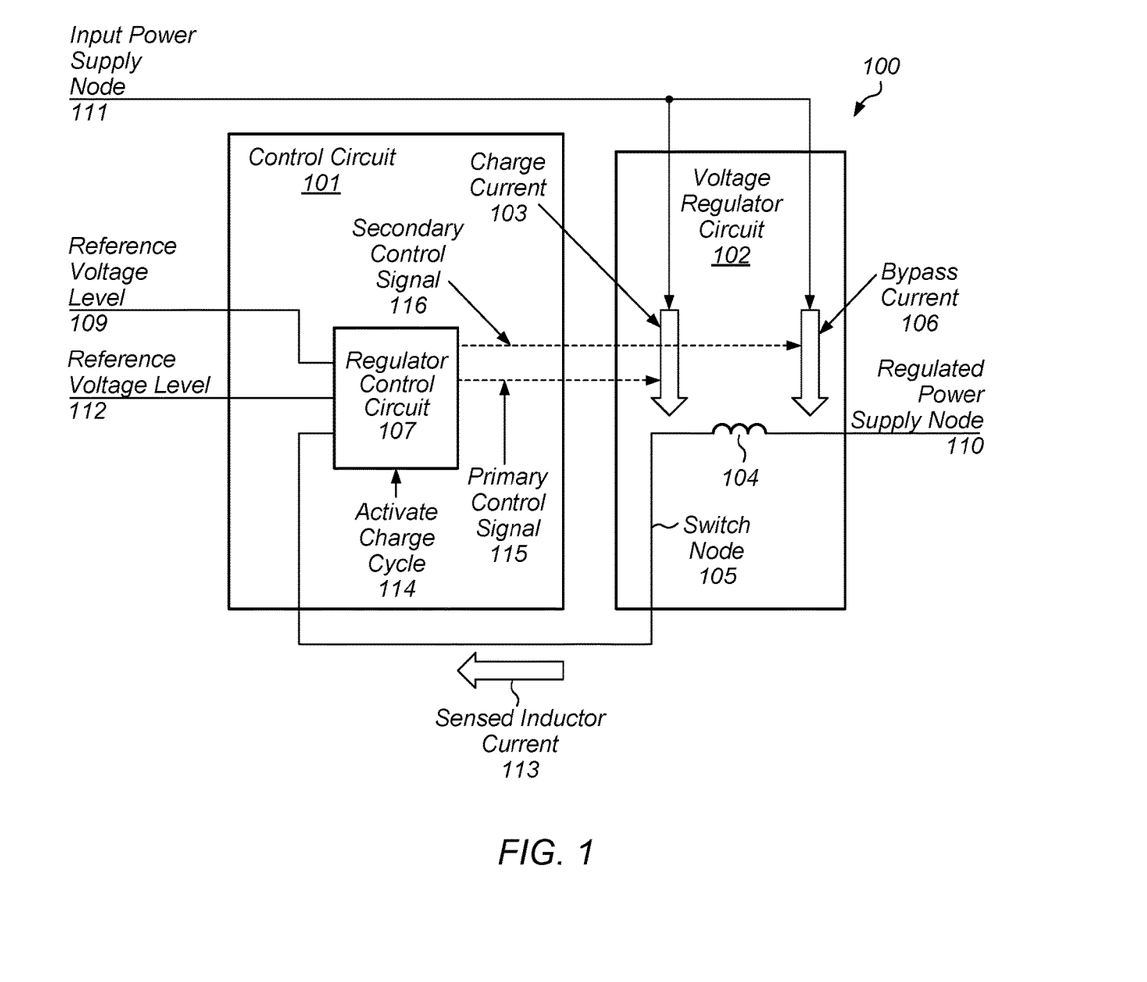
FIG. 1 illustrates a block diagram of an embodiment of a power converter circuit.

A block diagram depicting an embodiment of a power converter circuit is illustrated in FIG. 1. As illustrated, power converter circuit 100 includes control circuit 101 and voltage regulator circuit 102.

Voltage regulator circuit 102 includes switch node 105 coupled to regulated power supply node 110 via inductor 104. In various embodiments, voltage regulator circuit 102 is configured to source charge current 103 to switch node 105, in response to regulator control circuit 107 initiating charge cycle 114 thereby activating primary control signal 115. Additionally, voltage regulator circuit 102 is configured to source bypass current 106 to regulated power supply node 110 in response to using secondary control signal 116.

As noted above, bypass current 106 may be sourced to regulated power supply node 110 based, at least in part, on the voltage level regulated power supply node 110. The value and timing of bypass current 106 may be determined independent of charge current 103. It is noted that although a single voltage regulator circuit is depicted in the embodiment of FIG. 1, in other embodiments, multiple voltage regulator circuits (collectively "phase units" or "phase circuits") may be coupled to regulated power supply node 110, in parallel, and operated with different timings (or "phases").

Control circuit 101 is configured to initiate charge cycle 114 using reference voltage level 109 and sensed inductor current 113. In various embodiments, control circuit 101 may be configured to activate primary control signal 115 in response to an activation of charge cycle 114. As described below in more detail, control circuit 101 may be configured to compare sensed inductor current 113 to a target current generated using reference voltage level 109 and a voltage level of regulated power supply node 110. It is noted that although sensed inductor current 113 is show as being sensed from switch node 105, in other embodiments, sensed inductor current 113 may be sensed using regulated power supply node 110 or any other suitable circuit on included in or related to voltage regulator circuit 102.

Control circuit 101 is further configured to secondary control signal 116 using reference voltage level 112 and a voltage level of regulated power supply node 110. In some embodiments, control circuit 101 may generate secondary control signal 116 such that a voltage level of secondary control signal 116 is based, at least in part, on the voltage level of regulated power supply node 110 and reference voltage level 112. By using reference voltage level 112 and the voltage level of regulated power supply node 110 to adjust a value of secondary control signal 116, power converter circuit 100 effectively adds a second high-bandwidth low-gain control loop for controlling bypass current 106 in parallel with the control loop that controls charge current 103. The second control loop allows for maintaining a minimum voltage level on regulated power supply node 110, while reducing the possibility of introducing voltage and/or current spikes on the input power supply node 111 and the regulated power supply node 110.

As described below in more detail, control circuit 101 may be further configured to generate reference voltage level 112 using reference voltage level 109. In some cases, however, both reference voltage levels 109 and 112 may be generated by circuits in the computer system that are external to power converter circuit 100. In some cases, reference voltage level 112 may be less than reference voltage level 109, and may be generated using a bias current.

Figure 2:
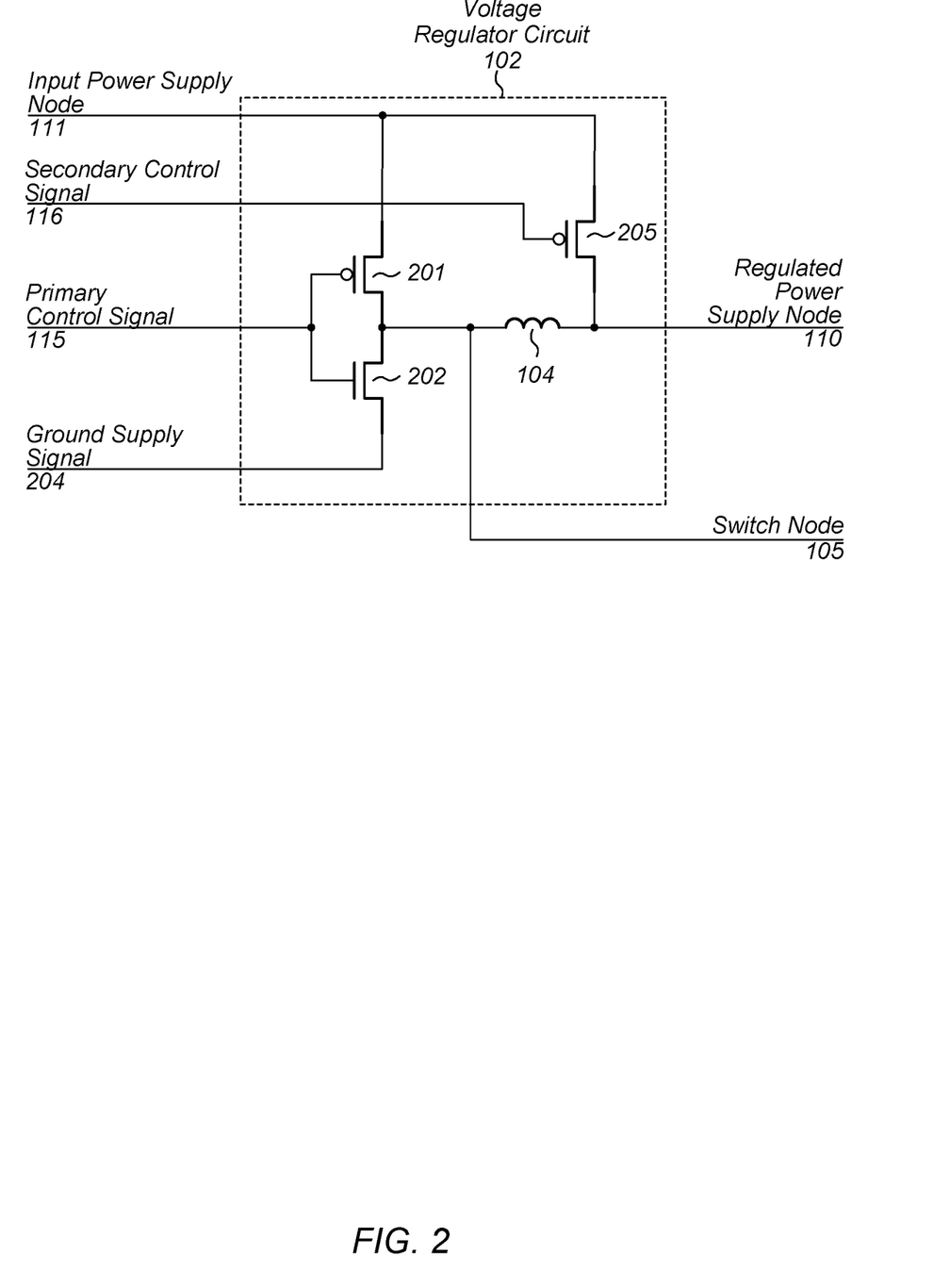
FIG. 2 illustrates schematic diagram of an embodiment of a voltage regulator circuit.

Voltage regulator circuits, such as voltage regulator circuit 102, may be designed according to one of various design styles. A schematic diagram of a particular embodiment of voltage regulator circuit 102 is depicted in FIG. 2. As illustrated, voltage regulator circuit 102 includes inductor 104, devices 201 and 202, which are both coupled to switch node 105, and controlled by primary control signal 115, and device 205 which is coupled to regulated power supply node 110 and is controlled by secondary control signal 116.

In various embodiments, control circuit 101 may generate primary control signal 115, which is used to activate one of devices 201 and 202 during charge and discharge cycles. During a charge cycle, current is sourced from input power supply node 111 to switch node 105, and during a discharge cycle, current is sunk from switch node 105 into ground supply node 204. Alternating between charge and discharge cycles, and adjusting the duration of either of the charge or discharge cycles may maintain a desired voltage level maintained on regulated power supply node 110.

Control circuit 101 may also generate secondary control signal 116, which is used to adjust the transconductance of device 205. By adjusting the transconductance of device 205, an impedance between input power supply node 111 and regulated power supply node 110 may be varied (either higher or lower). As the impedance is varied in response to changes in the value of secondary control signal 116, an amount of current, e.g., a value of bypass current 106, changes, which, in turn, changes the voltage level of regulated power supply node 110.

Device 201 is coupled between input power supply node 111 and switch node 105, and is controlled by primary control signal 115. During a charge cycle, primary control signal 115 is asserted, which activates device 201 and couples input power supply node 111 to switch node 105, thereby charging switch node 105 by allowing a current to flow from input power supply node 111 to switch node 105, and then onto regulated power supply node 110. As described below in more detail, the duration of the charge cycle may be based on a comparison of a generated current to a combination of generated and sensed currents.

As used herein, asserting, or an assertion of, a signal refers to setting the signal to a particular voltage level that activates a circuit or device coupled to the signal. The particular voltage level may be any suitable value. For example, in the case where device 201 is p-channel MOSFET, primary control signal 115 may be set to a voltage at or near ground potential when activated.

Device 202 is coupled between switch node 105 and ground supply node 204, and is also controlled by primary control signal 115. During a discharge cycle, primary control signal 115 is set to a voltage level, which activates device 202 and couples switch node 105 to ground supply node 204, thereby providing a conduction path from regulated power supply node 110 through inductor 104 into ground supply node 204. While device 202 is active, current flows from regulated power supply node 110 into ground supply node 204, decreasing the voltage level of regulated power supply node 110.

Device 205 is coupled between input power supply node 111 and regulated power supply node 110, and is controlled by secondary control signal 116. When secondary control signal 116 is greater than a threshold voltage of device 205, bypass current 106 begins to flow through device 205 from input power supply node 111 and regulated power supply node 110. The value of bypass current 106 may be based, at least in part, on the voltage level as well as a voltage level of input power supply node 111. Since the control of device 205 is independent of the control of devices 201 and 202, bypass current 106 may be sourced to regulated power supply node 110 during either a charge or discharge cycle associated with devices 201 and 202.

Devices 201, 202, and 205 may be particular embodiments of MOSFETs. In particular, device 201 may be a particular embodiment of a p-channel MOSFET and devices 202 and 205 may be particular embodiments of n-channel MOSFETs. Although only three devices are depicted in the embodiment of FIG. 2, in other embodiments, any suitable number of devices, coupled in series or parallel, may be employed to achieve particular electrical characteristics (e.g., on-resistance of the devices).

Inductor 104 may be designed to achieve a desired level of inductance between switch node 105 and regulated power supply node 110, and fabricated using a semiconductor manufacturing process. In some cases, inductor 104 may be located on a common integrated circuit along with devices 201, 202, and 205. In other cases, inductor 104 may be located on an integrated circuit different from an integrated circuit on which devices 201, 202, and 205 are located. Although a single inductor is depicted in the embodiment of FIG. 2, in other embodiments, multiple inductors may be used to achieve a desired value of inductance between switch node 105 and regulated power supply node 110.

Figure 3:
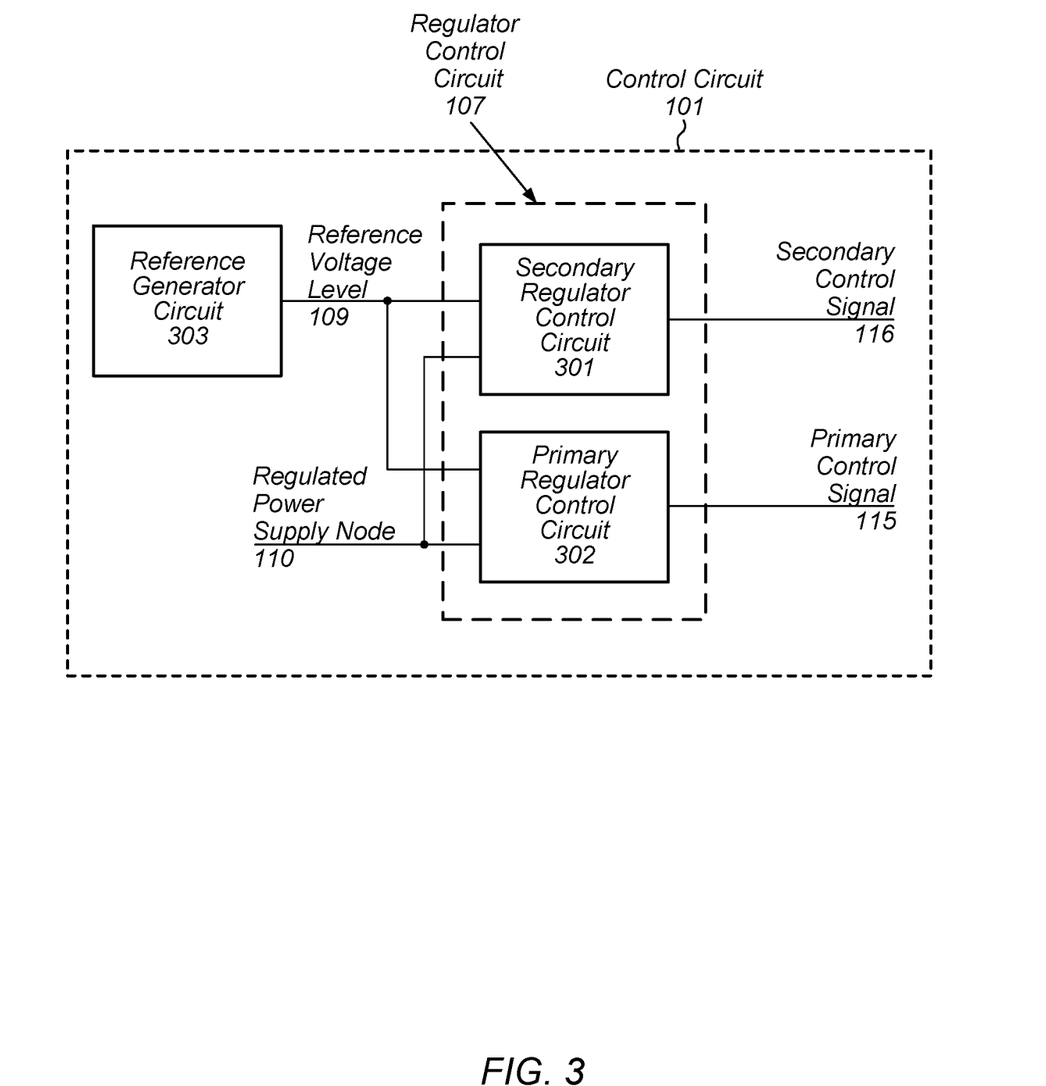
FIG. 3 illustrates a block diagram of an embodiment of a control circuit for a power converter circuit.

A block diagram of an embodiment of control circuit 101 is depicted in FIG. 3. As illustrated, control circuit 101 includes regulator control circuit 107, and reference generator circuit 303. Regulator control circuit 107 includes primary regulator control circuit 302 and secondary regulator control circuit 301.

In various embodiments, secondary regulator control circuit 301 may be configured to generate secondary control signal 116. In various embodiments, secondary regulator control circuit 301 may include any suitable combination of analog and/or digital circuits. For example, secondary regulator control circuit 301 may include analog comparator circuits, along with combinatorial and sequential logic circuits. In some cases, secondary regulator control circuit 301 may be further configured to change a voltage level of secondary control signal 115 using a voltage level of regulated power supply node 110.

As described below in more detail, secondary regulator control circuit 301 may be configured to generate a second reference voltage level using reference voltage level 109. In some cases, the second reference voltage level may be less than reference voltage level 109. It is noted that, in some embodiments, a difference between reference voltage level 109 and the second reference voltage level may be based, at least in part, on a difference between a voltage level of input power supply node 111 and a voltage level of regulated power supply node 110.

Primary regulator control circuit 302 is configured to generate primary control signal 115 using reference voltage level 109 and the voltage level of regulated power supply node 110. As described below in more detail, primary regulator control circuit 302 may be further configured to generate primary control signal 115 using sensed inductor current 113 as well as a clock signal. In various embodiments, primary regulator control circuit 302 may include any suitable combination of analog and digital circuits configured to perform the operations described above. It is noted that primary regulator control circuit 302 may be configured to operate using either pulse width modulation or pulse frequency modulation to generate primary control signal 115.

Reference generator circuit 303 is configured to generate reference voltage level 109. In various embodiments, reference generator circuit 303 may include any suitable combination of analog and digital circuits configured to generate reference voltage level 109. For example, in some cases, reference generator circuit 303 may include a band gap reference circuit, or any other suitable supply and temperature independent bias circuit. It is noted that although reference generator circuit 303 is shown as being included in control circuit 101 in FIG. 3, in other embodiments, reference generator circuit 303 may be external to control circuit 101, or power converter circuit 100.

Figure 4:
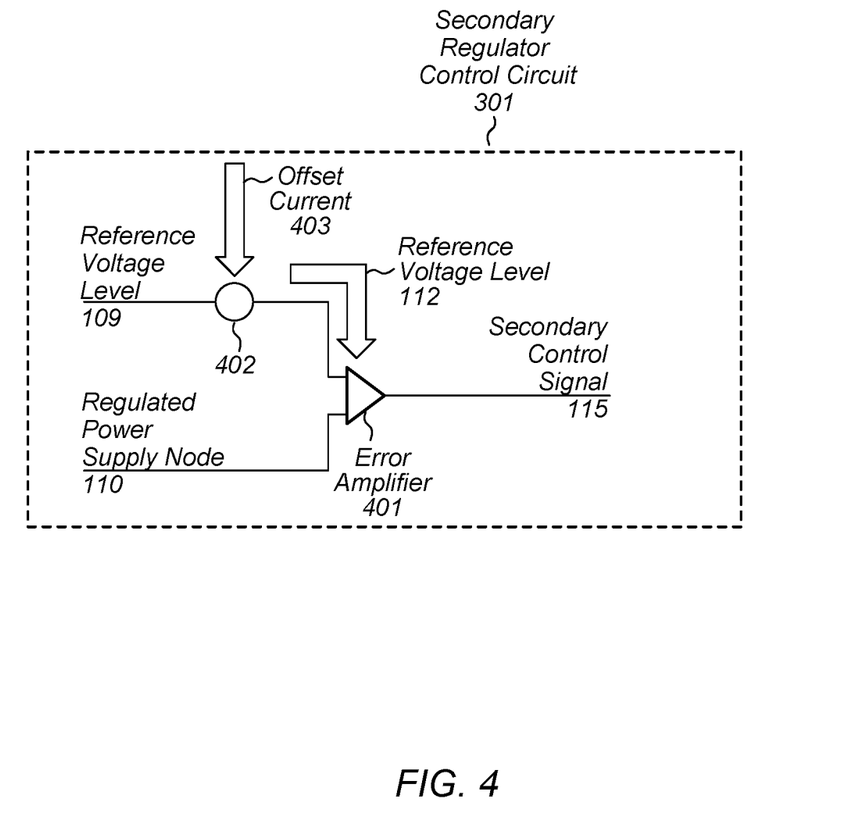
FIG. 4 illustrates a block diagram of a bypass control circuit.

As noted above, secondary regulator control circuit 301 may include various combinations of analog and digital circuits. A particular embodiment of secondary regulator control circuit 301 is depicted in FIG. 4. As illustrated, secondary regulator control circuit 301 includes error amplifier 401 and summation circuit 402.

Summation circuit 402 is coupled to error amplifier 401 and is configured to combine offset current 403 and reference voltage level 109 to generate reference voltage level 112. In various embodiments, a value of offset current 403 may be based on a difference between a voltage level of regulated power supply node 110 and input power supply node 111. Reference voltage level 112 may, in some embodiments, be less than reference voltage level 109. In some cases, offset current 403 may be generated by other circuits included in control circuit 101, or may be generated external to power converter circuit 100.

Summation circuit 402 may, in some embodiments, be a particular embodiment of an operational amplifier (OP AMP) or other suitable circuit suitable for combining voltage levels, currents, or any combination thereof. In some embodiments, summation circuit 402 may include circuits configured to convert offset current 403 to a voltage level, which may then be combined with reference voltage level 109 to generate reference voltage level 112.

Error amplifier 401 may be a particular embodiment of a differential amplifier, or other suitable circuit configured to generate secondary control signal 116 using reference voltage level 112 and a voltage level of regulated power supply node 110. In various embodiments, secondary control signal 116 may be an analog signal whose value is based, at least in part, on a difference between the voltage level of regulated power supply node 110 and reference voltage level 112. For example, in some cases, if the voltage level of regulated power supply node 110 is less than reference voltage level 112, secondary control signal 116 may be at a particular voltage level, while if the voltage level of regulated power supply node 110 is greater than reference voltage level 112, secondary control signal 116 may be at a different voltage level.

Figure 5:
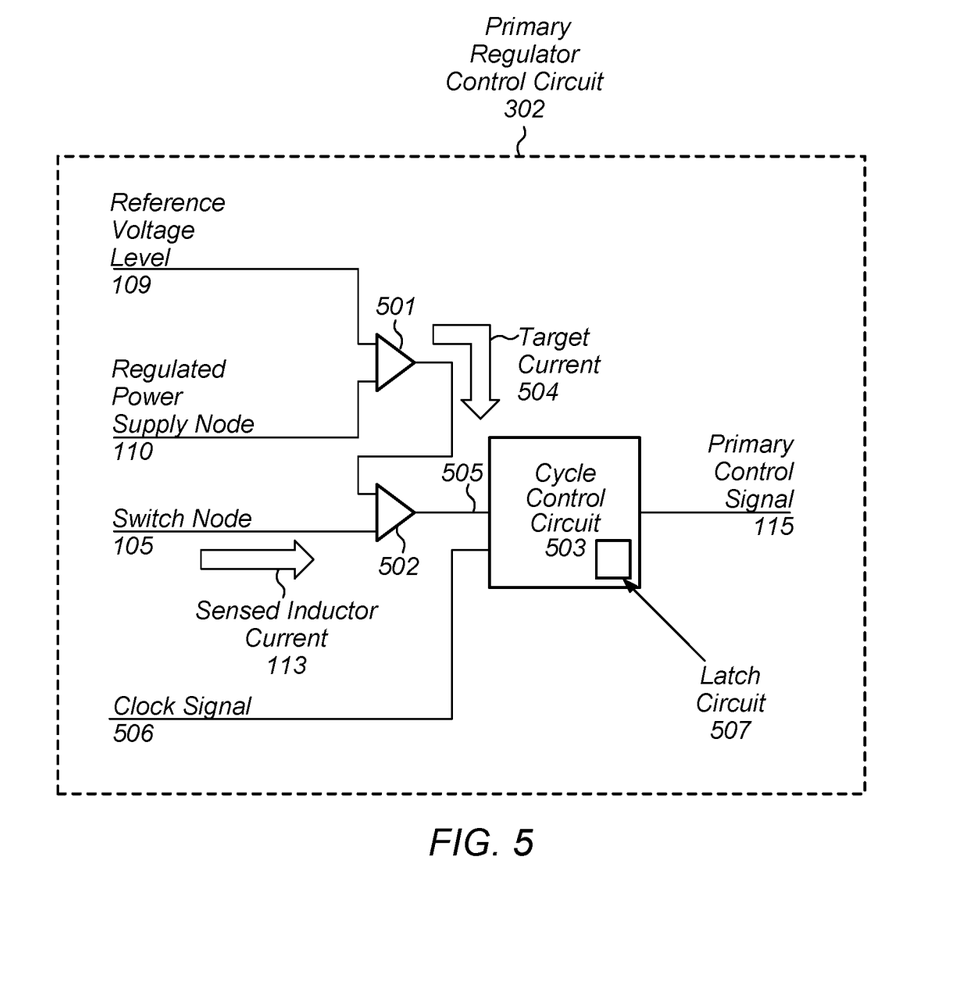
FIG. 5 illustrates a block diagram of a regulator control circuit.

Turning to FIG. 5, a block diagram depicting an embodiment of primary regulator control circuit 302 is depicted. As illustrated, primary regulator control circuit 302 includes transconductance amplifier 501, comparator 502, and cycle control circuit 503.

Transconductance amplifier 501 may be a particular embodiment of an amplifier circuit configured to generate target current 504 using reference voltage level 109 and a voltage level of regulated power supply node 110. In various embodiments, a value of target current 504 may be based, at least in part, on difference between the voltage level of regulated power supply node 110 and reference voltage level 109.

Comparator 502 is configured to generate a signal on node 505 using target current 504 and sensed inductor current 113. In various embodiments, comparator 502 may be configured to generate a digital (or logic) value on node 505 based, at least in part, on a difference between target current 504 and sensed inductor current 113.

Cycle control circuit 503 may be a particular embodiment of a sequential logic circuit that is configured to generate primary control signal 115 using the signal on node 505 and clock signal 506. In some embodiments, cycle control circuit 503 includes latch circuit 507, which is set to a particular state in response to a particular logic vale on node 505. Using the particular state to which latch circuit 507 is set, cycle control circuit may be configured to assert primary control signal 115. In response to an assertion of clock signal 506, cycle control circuit 503 may reset latch circuit 507 to a different state, which, in turn, is used by cycle control circuit 503 to de-assert primary control signal 115. It is noted that clock signal 506 may generated internal to power converter circuit 100, or may be generated external to power converter circuit 100 and may be shared by other circuit blocks included in a computer system.

Although primary regulator control circuit 302 uses sensed inductor current 113, the voltage level of regulated power supply node 110, to assert primary control signal 115, and clock signal 506 to de-assert primary control signal 115, in other embodiments, different signals may be used to generate primary control signal 115. For example, in some embodiments, primary control signal 115 may be asserted in response to an assertion of clock signal 506, and de-asserted based on the digital value present on node 505.

Structures such as those shown in FIGS. 2-5 for generating a voltage level on a regulated power supply node may be referred to using functional language. In some embodiments, these structures may be described as including "a means for sourcing a charge current to the switch node in response to an initiation of a charge cycle," "a means for sourcing a bypass current to the regulated power supply node using a regulator control signal," "a means for initiating the charge cycle using a first reference voltage level and a sensed inductor current," and "a means for generating the regulator control signal using a second reference voltage level and a voltage level of the regulated power supply node."

The corresponding structure for "means for sourcing a charge current to the switch node in response to an initiation of a charge cycle" is device 201 and equivalents to this circuit. The corresponding structure for "means for sourcing a bypass current to the regulated power supply node using a regulator control signal" is device 205 and its equivalents. The corresponding structure for "means for initiating the charge cycle using a first reference voltage level and a sensed inductor current" is comparator 501 and cycle control circuit 503, as well as their equivalents. Summation circuit 402 and error amplifier 401, as well as their equivalents, are the corresponding structure for "means for generating the regulator control signal using a second reference voltage level and a voltage level of the regulated power supply node."

Figure 6:
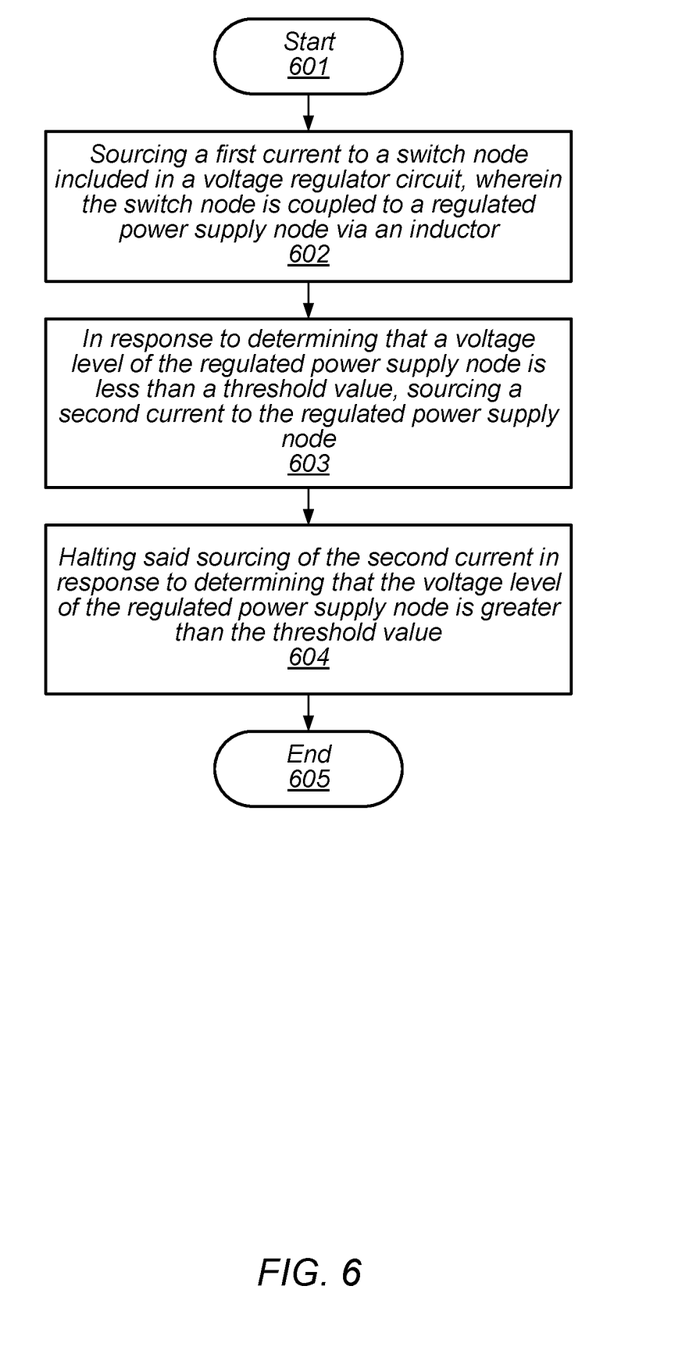
FIG. 6 illustrates a flow diagram depicting an embodiment of a method for operating a power converter circuit.

Turning to FIG. 6, a flow diagram depicting an embodiment of a method for operating a power converter circuit is illustrated. The method, which may be applied to power converter circuit 100 as depicted in FIG. 1, begins in block 601.

The method includes sourcing a first current to a switch node included in a voltage regulator circuit, where the switch node is coupled to a regulated power supply node via an inductor (block 602). In various embodiments, sourcing the first current may include coupling, using a first device, the switch node to an input power supply node. The method may, in some cases, include sourcing the first current using a sensed inductor current and a reference voltage level.

The method also includes, in response to determining that a voltage level of the regulated power supply node is less than a threshold value while the first current is being sourced, sourcing a second current to the regulated power supply node (block 603). In various embodiments, sourcing the second current may include adjusting an impedance, using a second device, between the regulated power supply node to the input power supply node.

In some embodiments, the method may include generating an offset current whose value is based, at least in part, on a difference between the voltage level of the regulated power supply node and the input power supply node. The method may, in other embodiments, include adjusting the threshold value using the offset current and the reference voltage level.

The method further includes halting said sourcing of the second current in response to determining that the voltage level of the regulated power supply node is greater than the threshold value while the first current is being sourced (block 604). In some cases, the method may also include halting said sourcing of the first current using a clock signal. The method concludes in block 605.

Figure 7:
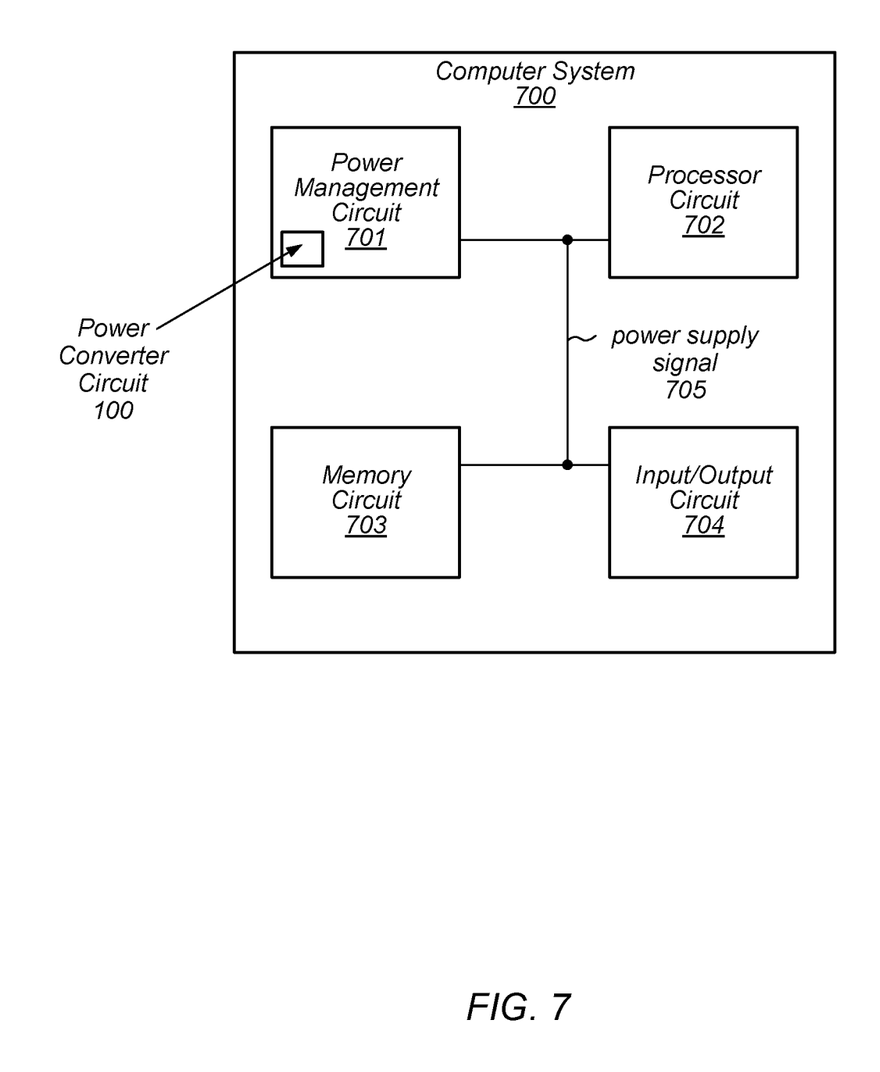
FIG. 7 depicts a block diagram of a computer system.

A block diagram of computer system is illustrated in FIG. 7. In the illustrated embodiment, the computer system 700 includes power management circuit 701, processor circuit 702, memory circuit 703, and input/output circuits 704, each of which is coupled to power supply signal 705. In various embodiments, computer system 700 may be a system-on-a-chip (SoC) and/or be configured for use in a desktop computer, server, or in a mobile computing application such as, e.g., a tablet, laptop computer, or wearable computing device.

Power management circuit 701 includes power converter circuit 100, which is configured to generate a regulated voltage level on power supply signal 705 in order to provide power to processor circuit 702, memory circuit 703, and input/output circuits 704. Although power management circuit 701 is depicted as including a single power converter circuit, in other embodiments, any suitable number of power converter circuits may be included in power management circuit 701, each configured to generate a regulated voltage level on a respective one of multiple internal power supply signals included in computer system 700. In cases where multiple power converter circuits are employed, two or more of the multiple power converter circuits may be connected to a common set of power terminals that connections to power supply signals and ground supply signals of computer system 700.

Processor circuit 702 may, in various embodiments, be representative of a general-purpose processor that performs computational operations. For example, processor circuit 702 may be a central processing unit (CPU) such as a microprocessor, a microcontroller, an application-specific integrated circuit (ASIC), or a field-programmable gate array (FPGA).

Memory circuit 703 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 7, in other embodiments, any suitable number of memory circuits may be employed.

Input/output circuits 704 may be configured to coordinate data transfer between computer system 700 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 704 may be configured to implement a version of Universal Serial Bus (USB) protocol or IEEE 1394 (Firewire®) protocol.

Input/output circuits 704 may also be configured to coordinate data transfer between computer system 700 and one or more devices (e.g., other computing systems or integrated circuits) coupled to computer system 700 via a network. In one embodiment, input/output circuits 704 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 704 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a voltage regulator circuit including a switch node coupled to a regulated power supply node via an inductor, wherein the voltage regulator circuit is configured to:
source a charge current to the switch node in response to a primary control signal; and
source a bypass current to the regulated power supply node in response to a secondary control signal; and
a primary control loop configured to generate the primary control signal based on a comparison of a first reference voltage level and a sensed inductor current; and
a secondary control loop configured, independently of the primary control loop, to:
generate a second reference voltage level using the first reference voltage level and a bias current; and
generate the secondary control signal based on a comparison of a voltage level of the regulated power supply node and the second reference voltage level whose value is based on the first reference voltage level; and
wherein a difference between the first reference voltage level and the second reference voltage level is based on a difference between a voltage level of an input power supply node and the voltage level of the regulated power supply node.

2. The apparatus of claim 1, wherein the second reference voltage level is less than the first reference voltage level.

3. The apparatus of claim 1, wherein the voltage regulator circuit includes a device coupled between the input power supply node and the regulated power supply node, and wherein the voltage regulator circuit is further configured to adjust a conductance of the device using the secondary control signal.

4. The apparatus of claim 1, wherein the secondary control loop is further configured to assert the secondary control signal in response to a determination that the voltage level of the regulated power supply node is less than the second reference voltage level.

5. A method, comprising:
generating, by a power converter circuit, a particular voltage level on a power supply node, wherein the generating includes:
controlling, by a primary control loop using a voltage of the power supply node and a first reference voltage level, a first current sourced to a switch node coupled to the power supply node via an inductor;
generating, by a secondary control loop independently of the primary control loop, a second reference voltage level using the first reference voltage level and a bias current;
controlling, by the secondary control loop independently of the primary control loop, a second current sourced to the power supply node using the voltage of the power supply node and the second reference voltage level and;
wherein a difference between the first reference voltage level and the second reference voltage level is based on a difference between a voltage level of an input power supply node and the voltage level of the power supply node.

6. The method of claim 5, wherein controlling the first current includes initiating sourcing of the first current based on a comparison of a target current to a sensed inductor current, wherein the target current is based on a comparison of the first reference voltage level and the voltage of the power supply node.

7. The method of claim 6, further comprising, generating an offset current whose value is based on a difference between the voltage level of the power supply node and an input power supply node.

8. The method of claim 7, adjusting the second reference voltage level using the offset current and the first reference voltage level.

9. The method of claim 5, wherein controlling, by the primary control loop, the first current includes coupling, using a first device, the switch node to an input power supply node.

10. The method of claim 9, wherein controlling, by the secondary control loop, the second current includes adjusting a conductance of a second device coupled between the power supply node and the input power supply node.

11. The method of claim 5, wherein controlling, by the primary control loop, the first current includes halting sourcing of the first current using a clock signal.

12. An apparatus, comprising:
a voltage regulator circuit including a switch node coupled to a regulated power supply node via an inductor, wherein the voltage regulator circuit is configured to:
source a charge current to the switch node in response to an initiation of a charge cycle; and
source a bypass current to the regulated power supply node using a regulator control signal; and
a primary regulator control circuit configured to initiate the charge cycle using a first reference voltage level and a sensed inductor current; and
a secondary regulator control circuit configured, independently of the primary regulator control circuit initiating the charge cycle, to:
generate a second reference voltage level using the first reference voltage level and a reference current, wherein a difference between the first reference voltage level and the second reference voltage level is based on a difference between a voltage level of an input power supply node and the voltage level of the regulated power supply node;
perform a comparison of the voltage level of the regulated power supply node and the second reference voltage level; and
generate the regulator control signal using results of the comparison.

13. The apparatus of claim 12, wherein the voltage regulator circuit includes:
a first device coupled between an input power supply node and the switch node; and
a second device coupled between the input power supply node and the regulated power supply node.

14. The apparatus of claim 13, wherein to source the charge current to the switch node, the voltage regulator circuit is further configured to couple the switch node to the input power supply node using the first device.

15. The apparatus of claim 14, wherein to source the bypass current to the regulated power supply node, the voltage regulator circuit is further configured to adjust a resistance between the regulated power supply node and the input power supply node using the second device.

16. The apparatus of claim 13, wherein the primary regulator control circuit is further configured to generate a sense voltage level using the sensed inductor current and compare the sense voltage level to a target voltage level.

17. The apparatus of claim 16, wherein a value of the reference current is based on a difference between the voltage level of the regulated power supply node and a voltage level of the input power supply node.

18. The apparatus of claim 13, wherein the primary regulator control circuit is further configured to halt the charge cycle using a clock signal.

* * * * *